United States Patent
Liu et al.

(10) Patent No.: US 11,474,204 B2
(45) Date of Patent: Oct. 18, 2022

(54) LOCALIZATION METHOD AND ROBOT USING THE SAME

(71) Applicant: UBTECH ROBOTICS CORP LTD, Shenzhen (CN)

(72) Inventors: Zhichao Liu, Shenzhen (CN); Jian Zhang, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 465 days.

(21) Appl. No.: 16/699,765

(22) Filed: Dec. 2, 2019

(65) Prior Publication Data

US 2020/0241112 A1 Jul. 30, 2020

(30) Foreign Application Priority Data

Jan. 29, 2019 (CN) .......................... 201910085267.8

(51) Int. Cl.
  *G01S 7/48* (2006.01)
  *G01S 17/931* (2020.01)
  *G06K 9/62* (2022.01)

(52) U.S. Cl.
  CPC .......... *G01S 7/4808* (2013.01); *G01S 17/931* (2020.01); *G06K 9/6215* (2013.01)

(58) Field of Classification Search
  CPC .......... G01S 7/48; G01S 17/931; G01S 17/89; G06K 9/6215; G05D 1/0274; G05D 1/024; G06V 20/10; G06V 20/64; G01C 21/20

USPC ......................................................... 701/300
See application file for complete search history.

(56) References Cited

U.S. PATENT DOCUMENTS

| | | | | |
|---|---|---|---|---|
| 2009/0248304 A1* | 10/2009 | Roumeliotis | ........ | G01C 21/165 701/500 |
| 2017/0147003 A1* | 5/2017 | Karlsson | .................... | G06T 7/70 |
| 2018/0074209 A1* | 3/2018 | Madhow | ................. | G01S 19/11 |
| 2018/0253108 A1* | 9/2018 | Heinla | ..................... | G06T 7/579 |

FOREIGN PATENT DOCUMENTS

CN 107991683 A 5/2018
WO WO-2020048623 A1 * 3/2020

* cited by examiner

*Primary Examiner* — Marnie A Matt

(57) ABSTRACT

The present disclosure provides a localization method as well as a robot using the same. The method includes: obtaining laser scan points and particles; mapping each of the laser scan points to a global coordinate system based on each of the particles to obtain global boundary points of each of the particles; finding a matching boundary point in the global boundary points by comparing the global boundary points of the particle with points corresponding to static objects in a known map; calculating a distance between the matching boundary point of the particle and the points corresponding to the static objects, and increasing a weight of the matching boundary point if the distance is less than a preset threshold; calculating a weight of the particle by matching the global boundary points of the particle with the known map; and estimating a localization result.

20 Claims, 6 Drawing Sheets

310

LOCALIZATION METHOD AND ROBOT USING THE SAME

CROSS REFERENCE TO RELATED APPLICATIONS

This application claims priority to Chinese Patent Application No. 201910085267.8, filed Jan. 29, 2019, which is hereby incorporated by reference herein as if set forth in its entirety.

BACKGROUND

1. Technical Field

The present disclosure relates to localization technology, and particularly to a localization method as well as a robot using the same.

2. Description of Related Art

For a carrier having autonomous movement capability, for example, a robot or an unmanned aerial vehicle, it can collect data of sensors installed thereon during the operation and combine the data of a known map to perform the localization for the position and the posture (abbreviated as a pose) of the carrier itself, thereby performing autonomous navigation.

In navigation, it is often necessary to detect the surrounding environment and confirm the current position of the carrier in the known map according to the known map while, for example, during initialization or there's a localization error during navigation, which may also be referred to as localization.

The commonly used localization method includes Monte Carlo localization (MCL) method and adaptive Monte Carlo localization (AMCL) method, which have low computational resource requirements, and has high localization accuracy and low time consumption in case that the environment does not change and has obvious features. However, in the case that the environment changes, the accuracy will be low, the error rate will be high, and the time consumption will be high. In practical applications, environmental changes are difficult to control, and localization may have error, which affects the safety of navigation.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

The present disclosure will be described in detail in conjunction with the drawings and embodiments. The embodiments which are not conflict can be combined with each other.

Figure 1:
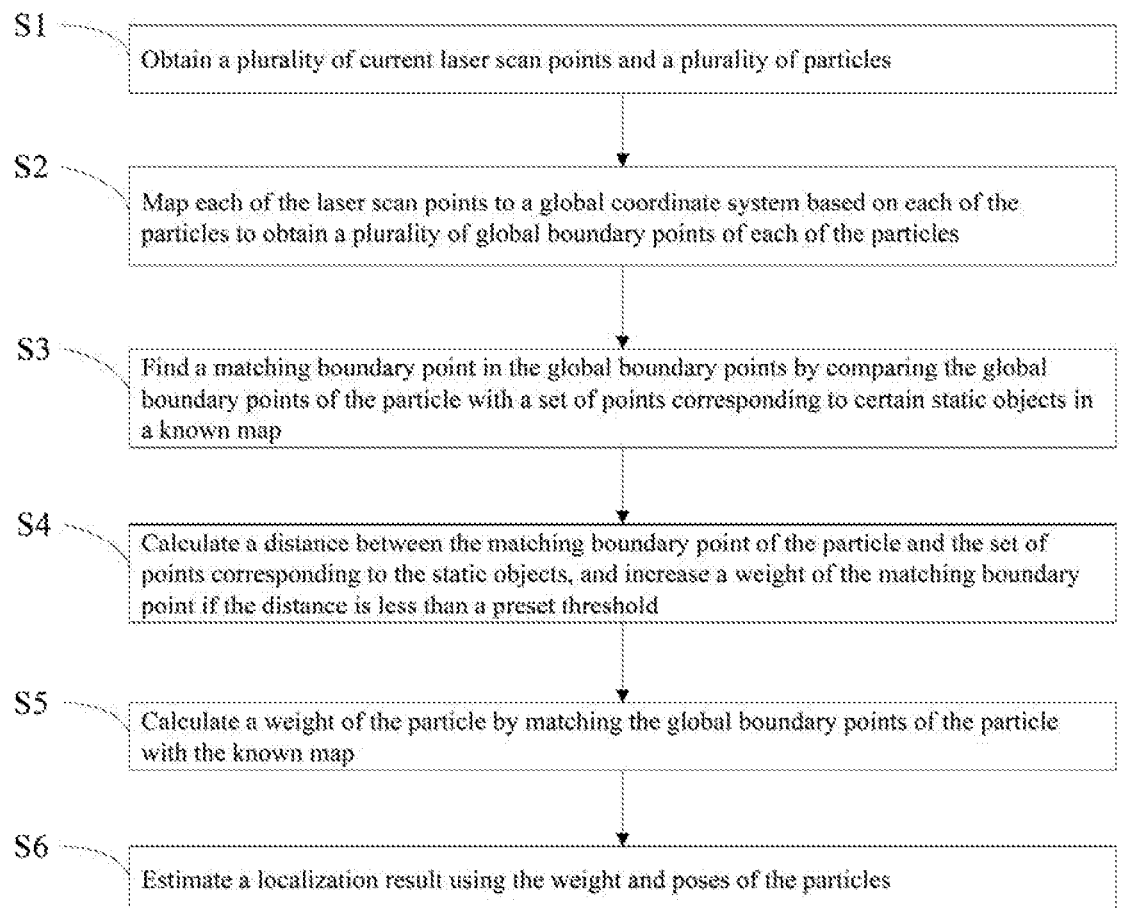
FIG. 1 is a flow chart of an embodiment of a localization method according to the present disclosure.
Figure 4:
FIG. 4 is a schematic block diagram of an embodiment of a localization apparatus according to the present disclosure.
Figure 5:
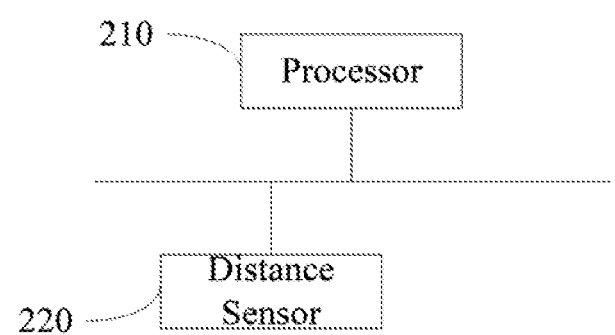
FIG. 5 is a schematic block diagram of an embodiment of a robot according to the present disclosure.
Figure 6:
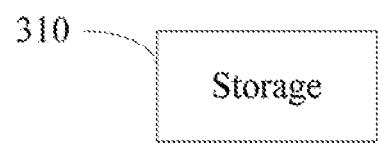
FIG. 6 is a schematic block diagram of an embodiment of a computer readable storage medium according to the present disclosure.

FIG. 1 is a flow chart of an embodiment of a localization method according to the present disclosure. In this embodiment, a localization method for a robot is provided. The method is a computer-implemented method executable for a processor, which may be implemented through and applied to a localization apparatus as shown in FIG. 4, a robot as shown in FIG. 5, or implemented through a computer readable storage medium as shown in FIG. 6. In other embodiment, the localization method can be applied to another kind of carrier capable of autonomous movement and navigation, for example, an unmanned aerial vehicle. As shown FIG. 1, the method includes the following steps.

S1: obtaining a plurality of current laser scan points and a plurality of particles.

In this embodiment, the localization method can be based on particle filter localization which is referred to as Monte Carlo localization (MCL). The principle of particle filtering is to describe a posterior probability density of any state in an approximate manner using, a finite set of weighted random samples (particles). The advantage of particle filtering lies in solving complex problems, such as the state recursive estimation problem of a highly nonlinear and non-Gaussian dynamic system.

Figure 2:
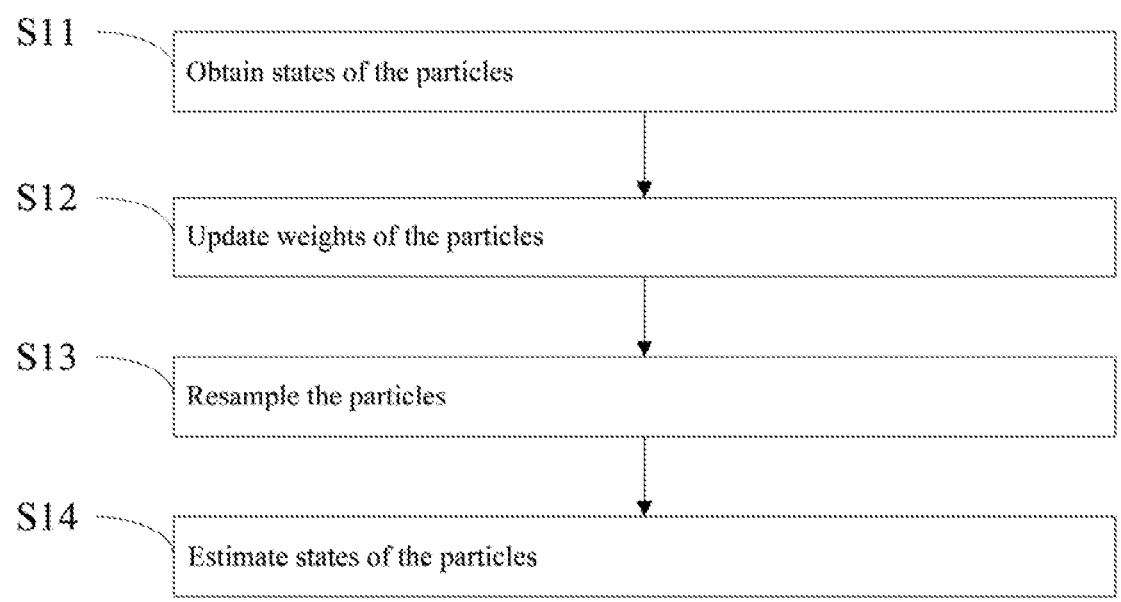
FIG. 2 is a flow chart of particle Filtering according to an embodiment of the present disclosure.

FIG. 2 is a flow chart of particle filtering according to an embodiment of the present disclosure. As shown in FIG. 2, the particle filtering includes the inflowing steps.

S11: obtaining states of the particles.

The initial particles can be randomly generated, and the current state of each particle can be predicted based on the motion model of the system and the state of the particle at a previous moment.

S12: updating weights of the particles.

Each particle has a weight that is used to evaluate the matchness of the particle and the actual state of the system. The initial weight of all particles are generally set to be the same, and the weights of the particles can be updated using measurement data, where the higher the matchness with the measurement data, the higher the weight of the particles.

S13: resampling the particles.

In the actual calculation, after several cycles, there will be only a few particles have larger weights, while the weights of the remaining particles are negligible. The variance of the weights of the panicles increases with time, and the amount of the effective panicles decreases, where this problem is called the weight degradation problem. As the invalid particles increases, a large amount of calculation is wasted on the particles that are hardly works, so that the performance of the estimation is degraded. To avoid the weight degradation problem, the resample can be performed according to the weight of the particle, that is, the particle with a smaller weight can be replaced with a copy of the particle with a larger weight.

S14: estimating states of the particles.

The states and the weights of the particles are used to estimate the current state of the system.

The steps S11-S14 can be executed multiple times in loop manner, and each execution of steps S11-S14 can be referred to as one iteration.

The robot may need to perform multiple iterations based on particle filtering to realize localization.

The commonly used sensor for the localization of the robot is a distance sensor. The robot can use the distance sensor to scan the surrounding environment so as to range the surrounding objects to obtain multiple laser scan points. Each laser scan point has angle and distance information that provides map boundary (e.g., obstacles) information at that angle. The distance sensor can be a laser radar, an ultrasonic ranging sensor, an infrared ranging sensor, or the like.

Each particle represents a possible pose (i.e., a position and a posture) of the robot. If the current iteration is the initial iteration, the particle can be obtained by random generation; otherwise, if the current iteration is not the initial iteration, the particle of the current iteration can be predicted according to the particle and a control instruction of the previous iteration. For example, if the control instruction is for moving the robot by 0.1 m and rotating by 0.7 radians, it can make each particle of the previous iteration to move by 0.1 m and rotate by 0.7 radians, and reasonable control noise is added as needed to obtain the particle of the current iteration.

There is a problem with MCL that it cannot be recovered from robot abduction or global localization failure. As the number of iterations increases, the particles will be concentrated toward a single pose. If this pose happens to be incorrect, the algorithm cannot be recovered. This problem is very serious since it is possible to accidentally discard all the particles near the correct pose during the resampling step.

To solve this problem, in one embodiment, the plurality of particles includes at least one randomly injected particle, and the self-localization algorithm to be used is based on adaptive Monte Carlo localization (AMCL).

Compared with the MCL algorithm, in the AMCL algorithm, the short-term likelihood average estimation $w_{fast}$ and the long-term likelihood average estimation $w_{slow}$ can be considered to determine whether to randomly inject particles. For example, $\max(0, 1-w_{fast}/w_{slow})$ can be used as the probability of random sampling, and the particles are randomly injected according to the ratio of the two if when $w_{fast} < w_{slow}$, otherwise the particles are not randomly injected.

S2: mapping each of the laser scan points to a global coordinate system based on each of the particles to obtain a plurality of global boundary points of each of the particles.

In the related content of S2-S5, for convenience of explanation, except for the specified cases, only the update of the weight of one particle is taken as the example for description. In practice, it needs to calculate the weight for each particle, and there is no order limit between the calculation processes of the weight of different particles white they can be paralleled.

The angle and the distance of each laser scan point are the angle and the distance with respect to the current pose of the robot, and the coordinate of each laser scan point in the coordinate system of the robot can be determined. The coordinate system of the robot is a coordinate system created based on the current pose of the robot. For a single particle, the mapping is to transform the coordinate of the laser scan point in the robot coordinate system to the global coordinate system based on the particle to obtain the corresponding global boundary print. The position information of each of the global boundary points of each of the particles with respect to the particle is the same as, position information of the corresponding laser scan points, and the position information includes an angle and a distance.

S3: finding a matching boundary point in the global boundary points by comparing the global boundary points of the particle with a set of points corresponding to certain static objects in a known map.

The known map, also known as the current map, is the scope of localization. The localization can be classified into global localization and local localization according to whether the known maps are complete or not. The set of points, corresponding to the static objects in the known map includes a plurality of points corresponding to the static objects in the known map. The points corresponding to each static object are on the edge of the static object in the known map. The static object refers to an object that is fixed and does not be affected by environmental changes, for example, a door, a window, a column, and the like.

A matching boundary point is a global boundary point that successfully matches a point corresponding to a static object. In one embodiment, the global boundary point closest to the static object corresponded point can be used as the matching boundary point corresponding to the static object corresponded point; or it can find the closest point for the global boundary point from the known map, and then use the global boundary point as the matching boundary point when the point is a point corresponding to a static object.

In one embodiment, before performing this step, the set of points corresponding to the static objects can be obtained. Specifically, static object(s) can be extracted from the known map using depth learning to obtain the set of points corresponding to the static objects, or the known map can be registered with a static feature to obtain the set of points. The static feature is known, which represent the feature of a static object that can be manually extracted by a person from the map in advance. For example, after determining the known map for local localization, the static feature is registered with the known map through an iterative closest point (ICP) to find the set of points corresponding to the static object points in the known map.

S4: calculating a distance between the matching boundary point of the particle and the set of points corresponding to the static objects, and increasing a weight of the matching boundary point if the distance is less than a preset threshold.

Each global boundary point has a weight, which is generally inherited from the corresponding laser scan point. If the distance between a matching boundary point and the set of points corresponding to the static objects is less than the preset threshold, which means that the matchness between the matching boundary point and the set of points is high, and the weight of the matching boundary point can be increased.

If the distance is greater than or equal to the preset threshold, the weight of the matching boundary point may not be adjusted.

S5: calculating a weight of the particle by matching the global boundary points of the particle with the known map.

In one embodiment, the matching points closest to each global boundary point can be found from the known map, then the matchness (it is generally negatively correlated with the distance between the two, and is abbreviated as the matchness of the global boundary point) between each global boundary point and its corresponding matching point is calculated, and finally the weighted average of all the matchness is calculated to use as the weight of the particle. In the process of calculating the weighted average of the matchness, the weight of each matchness is the weight of its corresponding global boundary point.

In the prior art, if an environmental change occurs, for example, an object is added, disappeared, moved, or the like, the matchness of at least some non-matching boundary points may become small abnormally, which may bring a large error to the calculation result of the weight of the particles. In this embodiment, since the weights of the matching boundary points are increased, the calculation result of the weight of the particles are affected by the matchness of the matching boundary point, and the influences to the matchness of the non-matching boundary points become smaller, the effect of the environmental change to the weights of the particles is reduced.

S6: estimating a localization result using the weight and poses of the particles.

In one embodiment, the pose of the particles having the largest weight can be selected as the localization result. In addition, the particles can be resampled using the weight of the particle. Since resampling does not affect the particles with the greatest weight, there is no limit to the order of execution between the results of resampling and localization in this case.

In one embodiment, it can resample the particles using the weights of the particles, and calculate the weighted average of the pose of the resampled particles to use as the localization result. In this case, the weight of the pose of each particle during calculating the localization result is the weight of the particle.

The above-mentioned steps can be executed in a loop manner until the localization result that meets the requirements is obtained.

Through the implementation of the above-mentioned embodiment, the weights of the global boundary points are needed in the calculation process of the weights of the particles, and the weights of the matching boundary points in the global boundary points are increased, which means that it has considered more about the matchness with the set of points corresponding to the static objects in the calculation of the weights of the particles, and the static objects will not affected by environmental changes, so that the impact of environmental changes on localization is reduced, thereby improving the robustness and accuracy of localization.

Figure 3:
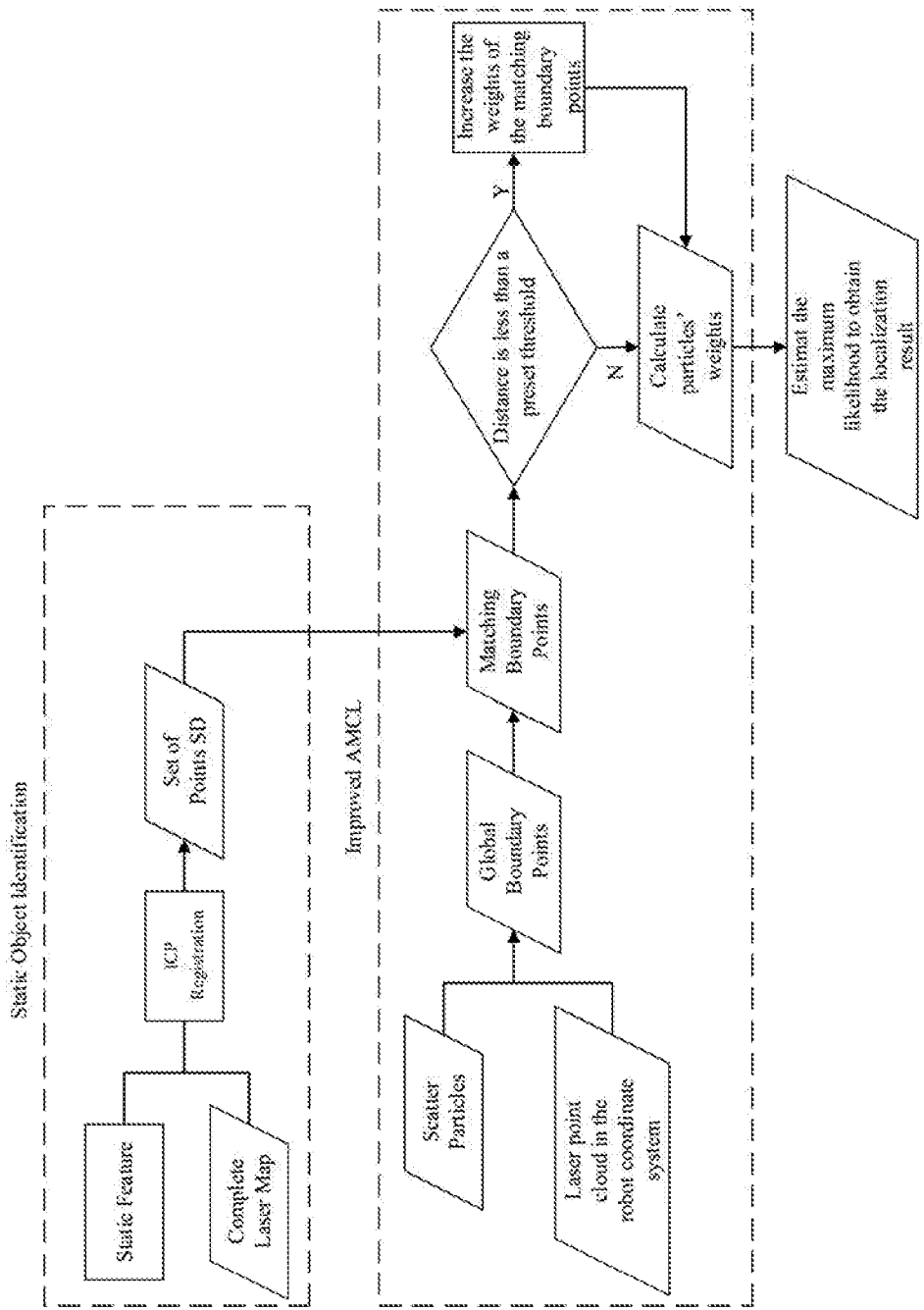
FIG. 3 is a flow chart of a detailed example of the localization method of FIG. 1.

FIG. 3 is a flow chart of a detailed example of the localization method of FIG. 1. As shown in FIG. 3, in this embodiment, the localization method includes two major parts: a static object identification and an improved AMCL.

In the static object identification part, the ICP registration is performed on the known map and the static feature to obtain a set of points SD corresponding to static objects.

In the improved AMCL part, first, a plurality of particles are obtained in a known map. In other words, particles are scattered in a known map, and a plurality of laser scan points (also referred to as a laser point cloud) in the coordinate system of the robot are obtained by scanning through a lidar. Then, for each particle, the laser scan points are mapped to the particle-based global coordinate system to obtain a plurality of global boundary points, and the global boundary points are matched with the set of points SD obtained in the static object identification part to obtain matching boundary points. Whether the distance between the matching boundary points and the set of points corresponding to the static object points is less than a preset threshold is determined, and if yes, the weights of the matching boundary points are increased; otherwise, the weights of the matching boundary points are not changed. Then, the weights of the particles are calculated, After calculating the weights of all the particles, the maximum likelihood estimation is performed to obtain the localization result, that is, the pose of one of the particles having the largest weight is taken as the result of the localization of the robot.

FIG. 4 is a schematic block diagram of an embodiment of as localization apparatus according to the present disclosure. As shown in FIG. 4, in this embodiment, a localization apparatus is provided which includes a processor 110. In which, only one processor 110 is shown in the figure, while the actual number can be more. The processor 110 can work alone or collaboratively.

The processor 110 controls the localization apparatus to operate, which can also be referred to as a CPU (central processing unit). The processor 110 can be an integrated circuit chip with the processing capability for signal sequences. The processor 110 can also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The processor 110 is configured to execute instructions to implement the method provided by any of the embodiments and their non-conflicting combination.

In this embodiment, each of the above-mentioned units/subunits is implemented in the form of software, which can be computer program(s) stored in a memory of the localization apparatus and executable on a processor of the localization apparatus. In other embodiments, each of the above-mentioned units; subunits may be implemented in the form of hardware (e.g., a circuit of the localization apparatus which is coupled to the processor of the localization apparatus) or a combination of hardware and software (e.g., a circuit with a single chip microcomputer).

FIG. 5 is a schematic block diagram of an embodiment of a robot according to the present disclosure. As shown in FIG. 5, the robot of the first embodiment of the present disclosure includes a processor 210 and a distance sensor 220.

The processor 210 controls the robot to operate, which can also be referred to as a CPU (central processing unit). The processor 210 can be an integrated circuit chip with the processing capability for signal sequences. The processor 210 can also be a general purpose processor, a digital signal processor (DSP), an application specific integrated circuit (ASIC), field-programmable gate array (FPGA), or be other programmable logic device, a discrete gate, a transistor logic device, and a discrete hardware component. The general purpose processor may be a microprocessor, or the processor may also be any conventional processor.

The distance sensor 220 is capable of obtaining distance information between the obstacle within the measurement range and the distance sensor 220. The distance sensor can be a lidar, an ultrasonic ranging sensor, an infrared ranging sensor, or the like.

The processor 210 is configured to execute instructions to implement the method provided by any of the embodiments and their non-conflicting combination.

FIG. 6 is a schematic block diagram of an embodiment of a computer readable storage medium according to the present disclosure. As shown in FIG. 6, in this embodiment, a readable storage medium is provided, which includes a storage 310 storing instructions. When the instructions are executed, the method provided by any of the embodiments and their non-conflicting combination are implemented.

The storage 310 can include a read-only memory (ROM), a random access memory (RAM), a flash memory, a hard disk, an, optical disk, and the like.

In the embodiments provided by the present disclosure, it should be understood that the disclosed method and apparatus may be implemented in other manners. For example, the above-mentioned apparatus embodiment is merely exemplary. For example, the division of module or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

in addition, the functional units in each of the embodiments may be integrated in sane processing unit, or each unit may exist alone physically, or two or more units may be integrated in one unit. The above-mentioned integrated unit may be implemented in the firm of hardware or in the form of software functional unit.

The integrated unit can be stored in a computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the tort of a software product. The software product is stored in a storage medium, which includes a number of instructions for enabling a computer device (which can be a personal computer, a server, a network device, etc.) or a processor to execute a or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented localization method, comprising executing on a processor steps of:
   obtaining a plurality of current laser scan points and a plurality of particles, wherein the particles comprise at least one randomly implanted particle, and whether to randomly inject the at least one randomly implanted particle is determined according to a short-term likelihood average estimation and a long-term likelihood average estimation;
   mapping each of the laser scan points to a global coordinate system based on each of the particles to obtain a plurality of global boundary points of each of the particles, wherein position information of each of the global boundary points of each of the particles with respect to the particle is the same as position information of the corresponding laser scan points;
   finding a matching boundary point in the global boundary points by comparing the global boundary points of the particle with a set of points corresponding to certain static objects in a known map;
   calculating a distance between the matching boundary point of the particle and the set of points corresponding to the static objects, and increasing a weight of the matching boundary point in response to the distance being less than a preset threshold;
   calculating a weight of the particle by matching the global boundary points of the particle with the known map; and
   estimating a localization result using the weight and poses of the particles.

2. The method of claim 1, wherein before the step of finding the matching boundary point in the global boundary points by comparing the global boundary points of the particle with the set of points corresponding to the static objects in the known map further comprises:
   obtaining the set of points corresponding to the static objects.

3. The method of claim 2, wherein the step of obtaining the set of points corresponding to the static objects comprises:
   extracting one or more static objects from the known map using depth learning to obtain the set of points corresponding to the static objects.

4. The method of claim 2, wherein the step of obtaining the set of points corresponding to the static objects comprises:
   obtaining the set of points corresponding to the static objects by registering the known map with a static feature.

5. The method of claim 1, wherein the step of estimating the localization result using the weight and the poses of the particles comprises:
   selecting the pose of one of the particles having the largest weight as the localization result.

6. The method of claim 5, wherein after the step of calculating the weight of the particle by matching the global boundary points of the particle with the known map further comprises:
   resampling the particles using the weight of the particle.

7. The method of claim 1, wherein the step of estimating the localization result using the weight and the poses of the particles comprises:
   resampling the particles using the weight of the particle; and
   calculating a weighted average of the pose of the resampled particles to use as the localization result.

8. The method of claim 1, wherein after the step of calculating the distance between the matching boundary point of the particle and the corresponding static object point further comprises:
   upon determining the distance being greater than or equal to the preset threshold, the weight of the matching boundary point is unchanged.

9. The method of claim 1, wherein in art initial iteration, the particles are obtained by random generation, and in non-initial iterations, the particles are predicted according to particles and a ruction of a previous iteration and a control noise.

10. The method of claim 9, wherein max(0, 1-$w_{fast}/w_{slow}$) is used as a probability of random sampling, where the $w_{fast}$ indicates the short-term likelihood average estimation, and the $w_{slow}$ indicates the long-term likelihood average estimation;
- the at least one randomly implanted particle is randomly injected according to a ratio of the Short-term likelihood average estimation and the long-term likelihood average estimation, when the short-term likelihood average estimation is less than the long-term likelihood average estimation; and
- the at least one randomly implanted particle is not randomly injected, when the short-term likelihood average estimation is not less than the long-term likelihood average estimation.

11. The method of claim 1, Wherein the laser scan point is obtained through a distance sensor, and the laser scan point has angle and distance information that provides map boundary information at an angle.

12. A robot comprising:
- a processor;
- a memory coupled to the processor;
- a distance sensor coupled to the processor; and
- one or more computer programs stored in the memory and executable on the processor, wherein the one or more computer programs comprise:
- instructions for obtaining a plurality of current laser scan points and a plurality of particles, wherein the particles comprise at least one randomly implanted particle, and whether to randomly inject the at least one randomly implanted particle is determined according to a short-term likelihood average estimation and a long-term likelihood average estimation;
- instructions for mapping each of the laser scan points to a global coordinate system based on each of the particles to obtain a plurality of global boundary points of each of the particles, wherein position information of each of the global boundary points of each of the particles with respect to the particle is the same as position information of the corresponding laser scan points;
- instructions for finding a matching boundary point in the global boundary points by comparing the global boundary points of the particle with a set of points corresponding to certain static objects in a known map to;
- instructions for calculating a distance between the matching boundary point of the particle and the set of points corresponding to the static objects, and increasing a weight of the matching boundary point in response to the distance being less than a preset threshold;
- instructions for calculating a weight of the particle by matching the global boundary points of the particle with the known map; and
- instructions for estimating a localization result using the weight and poses of the particles.

13. The robot of claim 1, wherein the one or more computer programs further comprise:
- instructions for obtaining the set of points corresponding to the static objects.

14. The robot of claim 13, wherein the instructions for obtaining the set of points corresponding to the static objects comprise:
- instructions for extracting one or more static objects from the known map using depth learning to obtain the set of points corresponding to the static objects.

15. The robot of claim 13, wherein the instructions for obtaining the set of points corresponding to the static objects comprise:
- instructions for obtaining the set of points corresponding to the static objects by registering the known map with a static feature.

16. The robot of claim 1, wherein the instructions for estimating the localization result using the weight and the poses of the particles comprise:
- instructions for selecting the pose of one of the particles having the largest weight as the localization result.

17. The robot of claim 16, wherein the one or more computer programs further comprise:
- instructions for resampling the particles using the weight of the particle.

18. The robot of claim 12, wherein the instructions thr estimating the localization result using the weight and the poses of the particles comprise:
- instructions for resampling the particles using the weight of the particle; and
- instructions for calculating a weighted average of the pose of the resampled particles to use as the localization result.

19. The robot of claim 12, wherein one or more computer programs further comprise:
- instructions for maintaining the weight of the matching boundary point as unchanged, upon determining the distance being greater than or equal to the preset threshold.

20. The robot of claim 12 wherein the distance sensor is a lidar, and the laser scan point has angle and distance information that provides map boundary information at an angle.

* * * * *